(12) United States Patent
Tasker et al.

(10) Patent No.: US 11,746,727 B2
(45) Date of Patent: Sep. 5, 2023

(54) AIRCRAFT PROPULSION SYSTEM CONFIGURED TO SUBSTANTIALLY CANCEL COMPONENT GYROSCOPIC FORCES

(71) Applicant: ROLLS-ROYCE plc, London (GB)

(72) Inventors: Richard V Tasker, Derby (GB); Andrew I J Rix, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/056,952

(22) Filed: Nov. 18, 2022

(65) Prior Publication Data
US 2023/0160357 A1 May 25, 2023

(30) Foreign Application Priority Data

Nov. 23, 2021 (GB) ...................................... 2116848

(51) Int. Cl.
| | | |
|---|---|---|
| *F02K 3/00* | (2006.01) | |
| *B64D 27/10* | (2006.01) | |
| *B64D 27/24* | (2006.01) | |
| *B64F 5/00* | (2017.01) | |
| *F02C 7/36* | (2006.01) | |
| *B64D 27/02* | (2006.01) | |

(52) U.S. Cl.
CPC ................ *F02K 3/00* (2013.01); *B64D 27/10* (2013.01); *B64D 27/24* (2013.01); *B64F 5/00* (2013.01); *F02C 7/36* (2013.01); *B64D 2027/026* (2013.01); *F05D 2260/40311* (2013.01)

(58) Field of Classification Search
CPC ..... F02K 3/00; B64D 2027/026; B64D 27/10; B64D 27/24; B64F 5/00; F02C 7/36; F05D 2260/40311

USPC .......................................................... 244/51
See application file for complete search history.

(56) References Cited

U.S. PATENT DOCUMENTS

| | | | |
|---|---|---|---|
| 1,434,620 | A | 11/1922 | McCain |
| 9,840,323 | B1 * | 12/2017 | Kaiser ..................... B64C 15/14 |
| 2018/0138766 | A1 * | 5/2018 | Moore ...................... H02K 1/28 |
| 2019/0061924 | A1 | 2/2019 | Kita |

(Continued)

FOREIGN PATENT DOCUMENTS

| | | |
|---|---|---|
| CN | 211417616 U | 9/2020 |
| EP | 3 835 562 A1 | 6/2021 |
| GB | 0360643 A | 11/1931 |

(Continued)

OTHER PUBLICATIONS

Mar. 23, 2023 Search Report issued in European Patent Application No. 22204849.8.

*Primary Examiner* — Brady W Frazier
(74) *Attorney, Agent, or Firm* — Oliff PLC (57) ABSTRACT

An aircraft propulsion system comprises a propulsor, a motor and a reduction gearbox coupled to a prime mover at an input side, and the propulsor at an output side. The reduction gearbox is configured to provide a reduction ratio between the input and output. The reduction gearbox is configured such that the input side rotates in an opposite direction to the output side, and the prime mover, motor, propulsor and reduction gearbox are configured such that gyroscopic forces of the propulsor, motor, prime mover and reduction gearbox generated during aircraft manoeuvres and/or propulsion system failures are substantially cancelled.

14 Claims, 10 Drawing Sheets

(56) References Cited

U.S. PATENT DOCUMENTS

2020/0095930 A1\* 3/2020 Blumer .................. F02C 3/113
2021/0095636 A1\* 4/2021 Seminel ................. B64D 27/24

FOREIGN PATENT DOCUMENTS

GB        0508501 A    6/1939
GB        2165024 A    4/1986
WO    2015/073084 A1   5/2015

\* cited by examiner

AIRCRAFT PROPULSION SYSTEM CONFIGURED TO SUBSTANTIALLY CANCEL COMPONENT GYROSCOPIC FORCES

CROSS-REFERENCE TO RELATED APPLICATIONS

This application claims priority pursuant to 35 U.S.C. 119(a) to United Kingdom Application No. 2116848.9, filed Nov. 23, 2021, which application is incorporated herein by reference in its entirety.

FIELD

The present disclosure concerns a propulsion system for an aircraft and an aircraft comprising the propulsion system.

BACKGROUND

Electric Propulsion system for aircraft have been proposed, in which one or more electric motors is employed to drive one or more propulsors. Hybrid propulsion systems are also known, in which a gas turbine engine or other internal combustion engine is used to drive the propulsors in concert with the electric motors. "Parallel hybrid" systems can be distinguished from so-called "series hybrid" systems, in that in a parallel hybrid system, a mechanical connection is provided between the internal combustion engine and at least one propulsor, with at least one electric motor driving either the same propulsor as that driven by the internal combustion engine, or a further propulsor. In a "series hybrid", the internal combustion engine is not mechanically coupled to any propulsor, but merely drives a generator to supply electric power to one or more motors.

SUMMARY

According to a first aspect there is provided an aircraft propulsion system comprising; a propulsor; a motor; and a reduction gearbox coupled to a prime mover at an input side, and the propulsor at an output side, the reduction gearbox being configured to provide a reduction ratio between the input and output; wherein the reduction gearbox is configured such that the input side rotates in an opposite direction to the output side, and the prime mover, motor, propulsor and reduction gearbox are configured such that gyroscopic forces of the propulsor, motor, prime mover and reduction gearbox generated during aircraft manoeuvres and/or propulsion system failures are substantially cancelled.

Advantageously, by counter-rotating the motor and propulsor, and by arranging the motor, gearbox and propulsor mass distributions and reduction gearing in a particular manner, gyroscopic forces can be substantially eliminated during aircraft manoeuvres. This can reduce bending forces in use, which may reduce fatigue and increase aircraft life. Furthermore, the structural mass that would normally be required to oppose these forces is reduced, thereby reducing the weight of the propulsion system.

The prime mover may comprise the motor and/or an internal combustion engine such as a gas turbine engine. The motor may be provided on the input or output side of the reduction gearbox.

The reduction gearbox may comprise an epicyclic gearbox in the form of a star gearbox comprising a sun gear defining the input side, one or more planet gears which mesh with the sun gear, a statically mounted planet carrier configured to rotatably mount the planet gears, and a ring gear which meshes with the planet gears, the ring gear being configured to rotate to define the output side. Advantageously, input and output side rotational directions are reversed, and a reduction ratio is provided, in a single unit.

The propulsion system may comprise one or more further electrical motors each coupled to a respective planet gear. Advantageously, gyroscopic forces can be eliminated or reduced, while design freedom is increased, since the further motor can be used to supplement power, while also adding to the rotational inertia of the gearbox. Consequently, the designer can accommodate a wider range of motor sizes and reduction ratios.

The propulsion system may comprise a further electric motor coupled to the output side of the gearbox. Advantageously, gyroscopic forces can be eliminated or reduced, while design freedom is increased, since the further motor can be used to supplement power, while also adding to the rotational inertia of the output side of the fan. Consequently, the designer can accommodate a wider range of motor sizes and reduction ratios compared to where a single motor is employed.

The gearbox may comprise a reduction ratio of between 1.5:1 and 3.5:1.

The electric motor may comprise one of an axial flux motor and a radial flux motor. The electric motor may comprise a rotor radially inward of a stator, or a rotor radially outward of a stator.

The propulsor may comprise one of an open rotor propeller and a ducted fan.

The motor, propulsor and reduction gearbox may be configured such that, at a given input and output rotational speed, the total angular momentum of clockwise rotating components is within 50% of the sum of total angular momentum of anti-clockwise rotating components. Consequently, the angular momentum of clockwise and anti-clockwise rotating components is substantially cancelled, thereby reducing or substantially eliminating gyroscopic forces.

Preferably, at a given input and output rotational speed, the total angular momentum of clockwise rotating components is within 20%, preferably within 10%, and more preferably within 5% of the sum of total angular momentum of anti-clockwise rotating components.

According to a second aspect of the invention there is provided a method of designing an aircraft propulsion system comprising defining a propulsor; defining a motor; and defining a reduction gearbox coupled to the motor at an input side, and the propulsor at an output side, the reduction gearbox being configured to provide a reduction ratio between the input and output, the reduction gearbox being configured such that the input side rotates in an opposite direction to the output side; and designing the motor, propulsor and reduction gearbox such that gyroscopic forces of the propulsor, motor and reduction gearbox generated during aircraft manoeuvres and/or propulsion system failures are substantially cancelled.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

Figure 1:
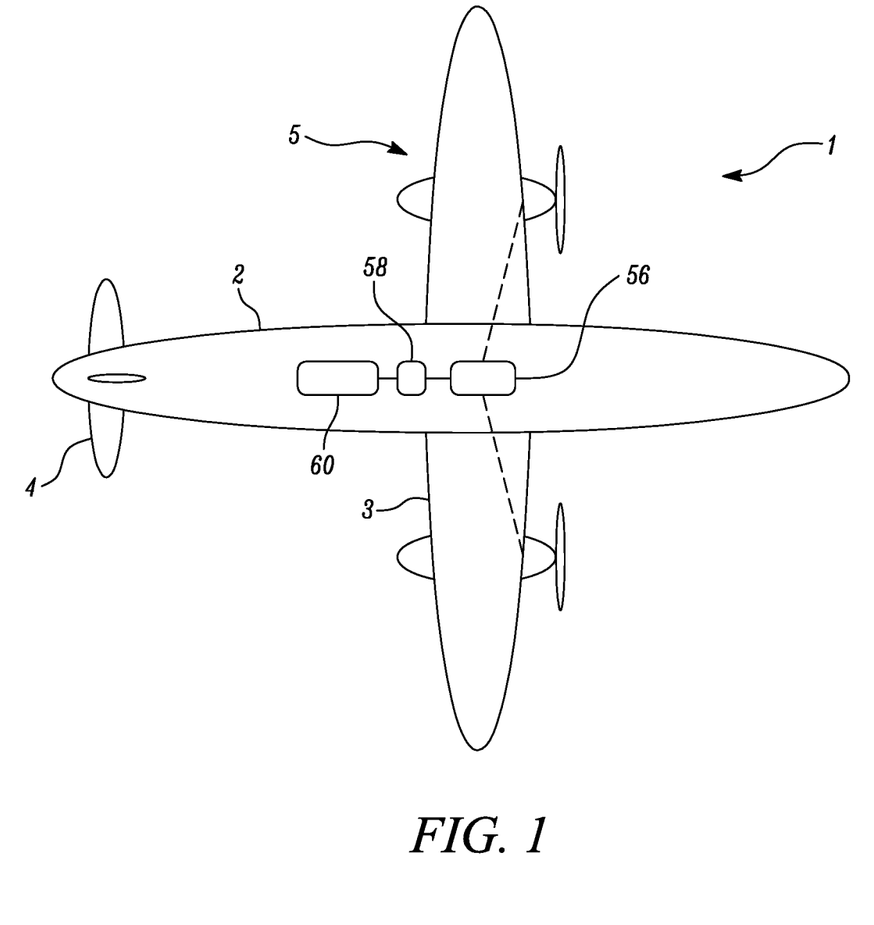
FIG. 1 is a plan view of a first aircraft comprising a propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
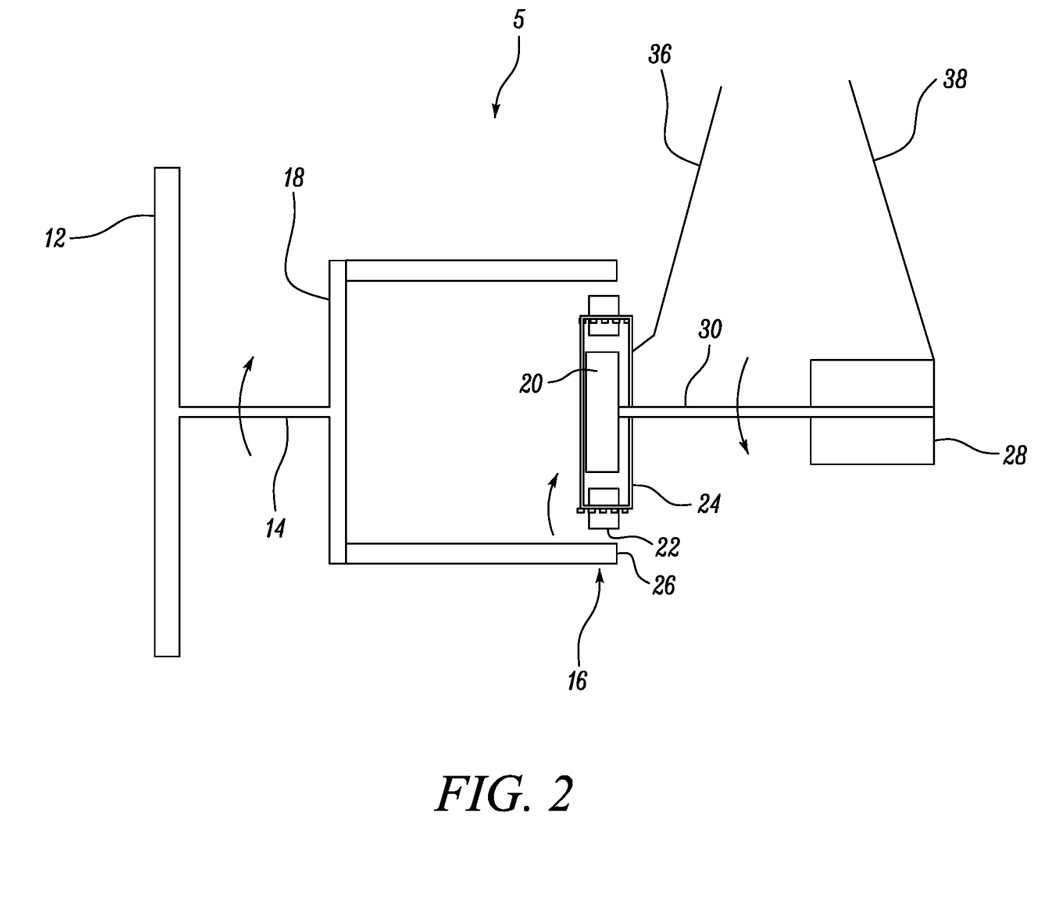
FIG. 2 is a schematic diagram of a propulsion system for the aircraft of FIG. 1.

FIG. 2 shows the propulsion system 5 schematically. The propulsion system 5 includes a propulsor 12. In this embodiment, the propulsor 12 comprises an open rotor propeller, but could alternatively comprise a ducted fan. The propulsor 5 is powered by an electrical energy source. In this embodiment, the energy source comprises a battery 56, which is in turn charged by a generator 58 driven by a gas turbine engine 60. Consequently, the aircraft can be considered to be a "series hybrid" aircraft.

The propulsor 12 is configured to provide thrust for the aircraft 1, and is coupled to a fan shaft 14 by bearings (not shown) which provide for rotation in use. The fan shaft 14 is in turn coupled to an output shaft 18 of a reduction gearbox 16.

The reduction gearbox 16 is in the form of an epicyclic star gearbox, comprising a sun gear 20, one or more planet gears 22 which mesh with the sun gear, a planet carrier 24 configured to rotatably mount the planet gears 22, and a ring gear 26 which meshes with the planet gears 22. The sun gear 20 is provided at a radially inner position, the ring gear 26 is provided at a radially outer position, and the planet gears 22 are provided therebetween.

The reduction gearbox 16 is configured as a star gearbox, in which each of the sun gear 20, planet gears 22 and ring gear 26 are mounted for rotation about their respective axes, while the planet carrier 24 is statically mounted, such that the planet gears 22 do not precess around the sun gear 20. Suitable bearing arrangements (not shown) are provided, to allow for rotation of each component, while providing the necessary support. The sun gear 20 is utilised as the input. The ring gear 26 is utilised as the output, and so is coupled to the fan 12 via the output shaft 18. A reduction ratio is provided between the input and output, which is equal to the number of ring gear teeth divided by the number of sun gear teeth. In one example, the reduction ratio is approximately 3:1, and is typically between 1.5 and 3.5:1.

Figure 5:
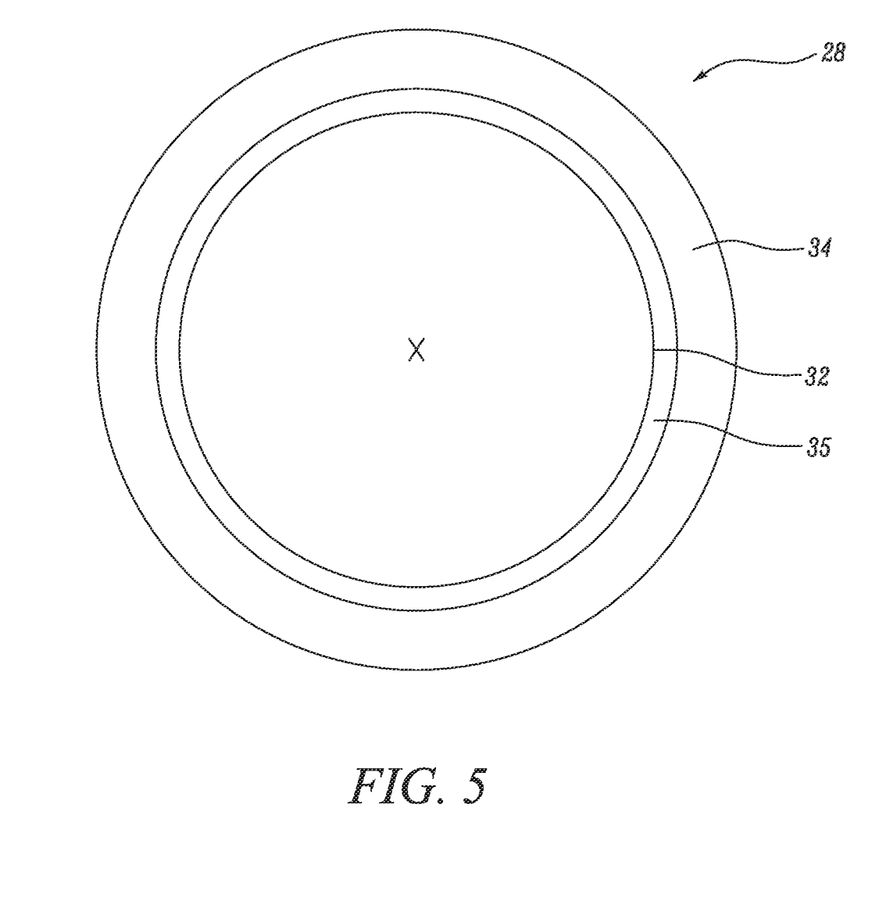
FIG. 5 is a schematic side view of an electric motor suitable for the propulsion system shown in any of FIGS. 2 to 4.
Figure 6:
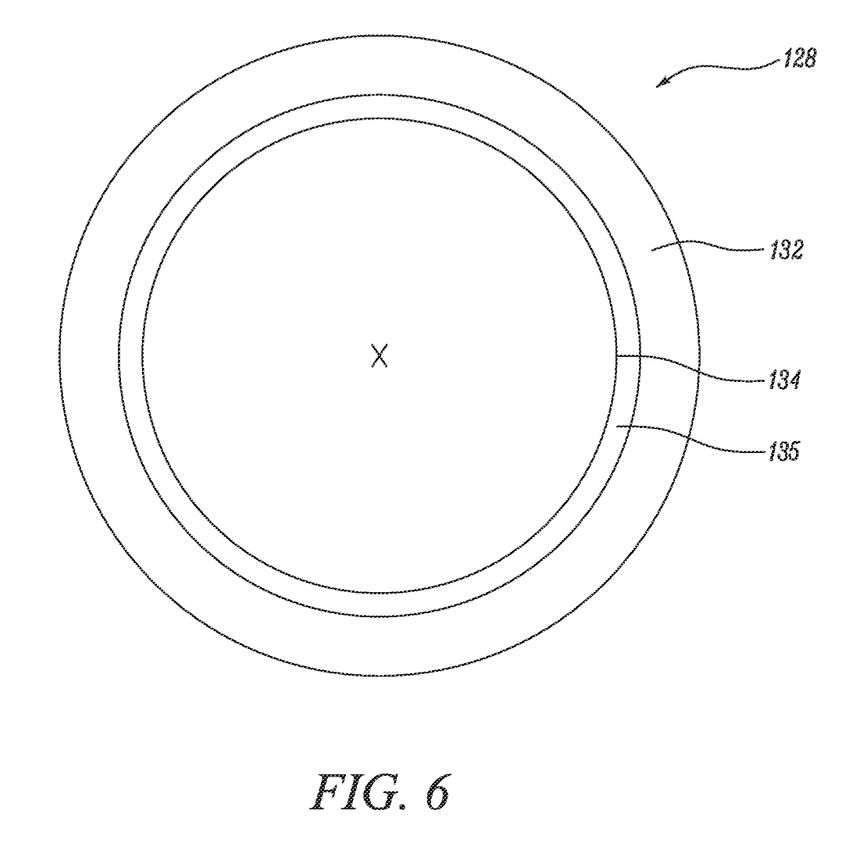
FIG. 6 is a schematic side view of an alternative electric motor suitable for the propulsion system shown in any of FIGS. 2 to 4.
Figure 7:
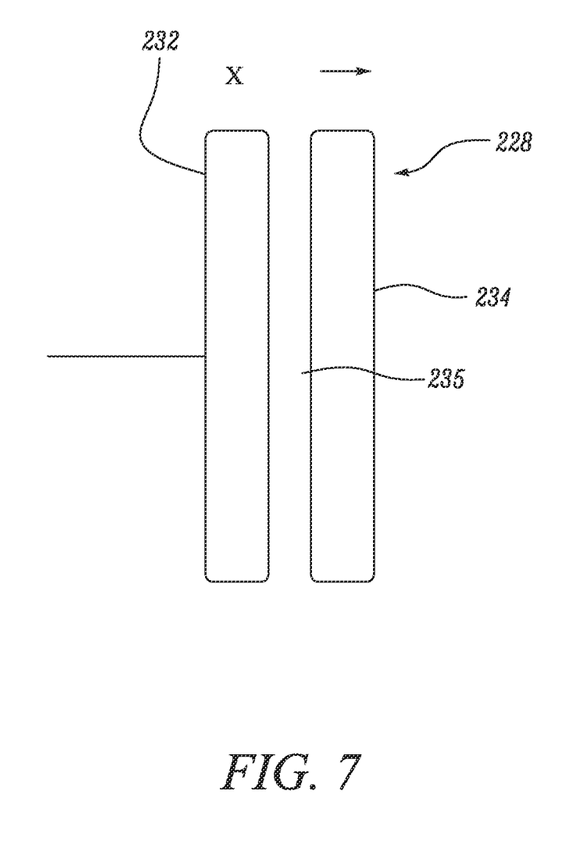
FIG. 7 is a schematic side view of a further alternative electric motor suitable for the propulsion system shown in any of FIGS. 2 to 4.

The propulsion system 5 further comprises a prime mover in the form of an electric motor 28 which is configured to drive the propulsor 12 via the reduction gearbox 16. The motor 28 is of a conventional type, such as an induction or permanent magnet electric machine. In the present embodiment, the motor 28 is coupled to the fan 12 via the sun gear 20 and an input shaft 30. Suitable electric motor types are shown in FIGS. 5 to 7. In the example shown in FIG. 5, the electric motor comprises an "in-runner" radial flux permanent magnet electric motor comprising a permanent magnet rotor 32 which rotates about an axis X. The rotor 32 is surrounded by a stator 34, provided radially outwardly of the rotor 32, separated by an air gap 35. The stator 34 comprises electrical windings (not shown), which can be energised to produce a rotating magnetic field. This rotating magnetic field interacts with a magnetic field produced by the permanent magnets of the rotor 32, to cause rotation. Since the magnetic flux between the rotor 32 and stator 34 crosses the air gap 35 in a radial direction.

The electric motor 28 is coupled to an energy storage device (not shown) in the form of one or more of a chemical battery, fuel cell, and capacitor, which provides the electric motor 28 with electrical power during operation. In some cases, multiple energy storages systems, which may be of different types (chemical battery, fuel cell etc) may be provided for each propulsion system 5. In other cases, a common energy storage device may be provided for multiple propulsion systems.

As shown in FIG. 2, the propulsion system comprises first and second struts 36, 38. The first strut 36 mounts the gearbox planet carrier 24 to the aircraft pylon or other appropriate static structure, while the second strut 38 mounts the motor 28 to the aircraft static structure.

FIG. 6 shows another suitable electric motor 128. The motor in this case is an "out-runner" radial flux electric motor. The motor 128 is similar to the motor 28, but the rotor 132 and stator 134 are reversed, such that the stator 134 is located radially inward of the rotor 132 and air gap 135.

Similarly, FIG. 7 shows a further suitable electric motor 228. In this case, the electric motor comprises an "axial flux" electric motor comprises a rotor 232 and stator 234. The rotor and stator are spaced in an axial direction, with an air gap 235 extending therebetween. Since the flux crosses the air-gap in the axial direction, the motor 228 is described as an axial flux machine.

In each case, the rotational speed of the rotor 32, 132, 232 of the motor is higher than the rotational speed of the fan 12. Electric machines are typically limited by their torque density (i.e. their maximum torque divided by their weight) rather than their power density (i.e. their maximum power divided by their weight). It is therefore desirable to operate electric machines at high rotational speed, to thereby maximise the mechanical power generated by the motor 28, 128, 228. On the other hand, it is desirable to rotate the fan 12 at a relatively low rotational speed, in order to minimise fan tip speed, to reduce aerodynamic losses. Consequently, the reduction gearbox 16 enables the motor 28 to turn at a higher rate than the fan 12. However, the gearbox 16 leads to an increased overall propulsion system 5 weight, and also represents a transmission loss (often in the range of approximately 1% of motor power). Consequently, it may be difficult to determine whether a direct drive or a reduction gearbox is preferable. The inventors have determined however that the reduction gearbox leads to overall system weight reduction, if certain criteria apply (as set out below).

It will be noted that the propulsion system 5 comprises several rotating components. These include the fan 12, fan shaft 14, output shaft 18, ring gear 26, planet gears 22, sun gear 20, motor shaft 30 and motor rotor 32. The bearings also represent rotating components, but can be ignored in this example in view of their relatively low mass. Each of these components will produce a gyroscopic moment, i.e. a force which resists turning in a direction normal to the rotational axis. In the event of an aircraft manoeuvre (such as yaw, pitch or roll), this gyroscopic moment will resist the turning moment imposed by the aircraft 1 on the propulsion system 5. This will in turn induce a bending force on structural components, in particular, struts 36, 38. Consequently, the more rapid the manoeuvre and the larger the rotational inertia of the rotating components, the larger the force will be.

These forces come into play in two situations in particular. At take-off, the aircraft rotates rapidly (i.e. pivots in the pitch axis). At this condition, the motor 28 and fan 12 will be running at high speed, and so the forces imparted on the struts 36, 38, and other structures will be high.

Separately, rotational inertia forces also come into play in the event of a sudden stop of a rotating component. For example, in the event of a fan shaft break, or a gearbox seizure, there may be a sudden acceleration or deceleration of one or more rotating components. This sudden acceleration will result in large torque moments applied to the static structure 36, 38, which must again be reacted.

Consequently, the static components 36, 38 must react loads in multiple directions, including twisting and pivoting directions. These loads may be high in view of the large rotational inertia in the propulsion system 5.

The inventors have however found that these gyroscopic and inertial moments can be minimised, by careful design of the motor 28, fan 12 and gearbox 16.

In the present disclosure, the gearbox 16 is arranged such that the input side (comprising the sun gear 20, motor shaft 30 and motor rotor 32) rotate in a first common direction (which could be clockwise or anticlockwise as desired). This is shown by the downward pointing arrow in FIG. 2. Since the gearbox 16 is a star gearbox configuration, in which the planet carrier 24 is held static, and the ring gear 26 is used as an output, the output side of the gearbox 16 rotates in an opposite direction to the input side. In this case, the rotating components of the output side of the gearbox 16 includes the fan 12, fan shaft 14, gearbox output shaft 18 and ring gear 26. The planet gears 22 also rotate in the same direction as the output side.

Each of the rotating components 12, 14, 18, 26, 20, 22, 30, 32 has a corresponding mass moment of inertia (rotational moment of inertia), i.e. the second moment of mass with respect to the distance from the axis. When rotating, the rotating components each have an angular momentum, and the propulsion system as a whole will have a total angular momentum equal to the vector sum of the individual angular momenta of the rotating components 12, 14, 18, 26, 20, 22, 30, 32.

As will be understood, the gyroscopic force imparted on the static structure 36, 38 is related to the angular momentum of the rotating components. By minimising the total angular momentum, preferably reducing this close to zero, the gyroscopic force is minimised. This will allow the static structure 36, 38 to be weaker and therefore lighter.

A first means for reducing the total angular momentum would be to reduce the mass of the components 12, 14, 18, 26, 20, 22, 30, 32, or design the components such that mass is carried at a smaller diameter. However, this severely restricts design freedom. For instance, it is desirable to have a large fan 12 diameter, to increase propulsive efficiency. Similarly, small diameter motors must rotate more quickly for a given power output, which may increase the required gear reduction to achieve a desired fan rotational speed.

The inventors have found that gyroscopic forces can instead be cancelled by arranging some components to rotate in a first direction (say, clockwise), and others in a second direction (say, anti-clockwise).

In the present disclosure, the sun gear 20, motor shaft 30 and motor rotor 32 rotate in a clockwise direction, and the fan 12, fan shaft 14, gearbox output shaft 18, planet gears 22 and ring gear 26 rotate in an anti-clockwise direction. By arranging the masses, relative rotational speeds (by altering the gear reduction ratio) and radial mass distributions of these components, the gyroscopic forces can be substantially cancelled at a given rotational speed. Since the speed relationship between the input and outputs sides is typically fixed (in view of a reduction gearbox 16 having a fixed reduction ratio), gyroscopic forces can be cancelled for substantially any rotational speed.

In one example, the rotational inertia of the fan 12, fan shaft 14, gearbox output shaft 18, planet gears 22 and ring gear 26 is equal to twice the rotational inertia of the sun gear 20, motor shaft 30 and motor rotor 32, and the gearbox 16 is arranged to have a reduction ratio of 2:1. Consequently, since the rotational speed of the clockwise rotating components is twice the rotational speed of the anti-clockwise rotating components, while the rotational inertia of the clockwise rotating components is half the rotational inertia of the ant-clockwise rotating components, the angular momentum of the input and output sides is equal and opposite at any given rotational speed, and so the gyroscopic forces are entirely cancelled.

In practice, the designer may adjust the mass distributions of the various components, and the reduction ratio, to achieve a desired combination of features, while substantially cancelling, or at least minimising, gyroscopic forces.

In practice, it may not be necessary to entirely cancel gyroscopic forces, and may not even be desirable. For instance, arranging the system to entirely cancel gyroscopic forces may lead to an undesirable compromise (for example, a non-optimal reduction ratio, non-optimal fan diameter, gearbox diameter, non-optimal motor speed, etc). Consequently, the inventors have found that it is desirable to reduce gyroscopic forces to less than 20% of what the forces would be if all the components rotated in the same direction. In other words, the rotating components are configured such that, at a given rotational speed, the sum of the angular momentum of the clockwise rotating components of the propulsor, motor and reduction gearboxes is within 20% of the sum of the of the angular momentum of each anti-clockwise rotating component of the propulsor, motor and reduction gearboxes. In other words, the vector sum of the angular momentum of the rotating components is compared to the sum of the absolute values (ignoring the different sign due to the opposite direction of rotation) of the angular momenta of the rotating components at a given speed. If the vector sum is less than 20% of the sum of the absolute values, then the gyroscopic forces can be said to be substantially cancelled.

In some cases, the gyroscopic forces may need to be cancelled to a greater degree, say between 1% and 10% of the sum of the absolute values of the rotating components at a given speed, or between 1 and 5% of the sum of the absolute values of the rotating components at a given speed.

Figure 3:
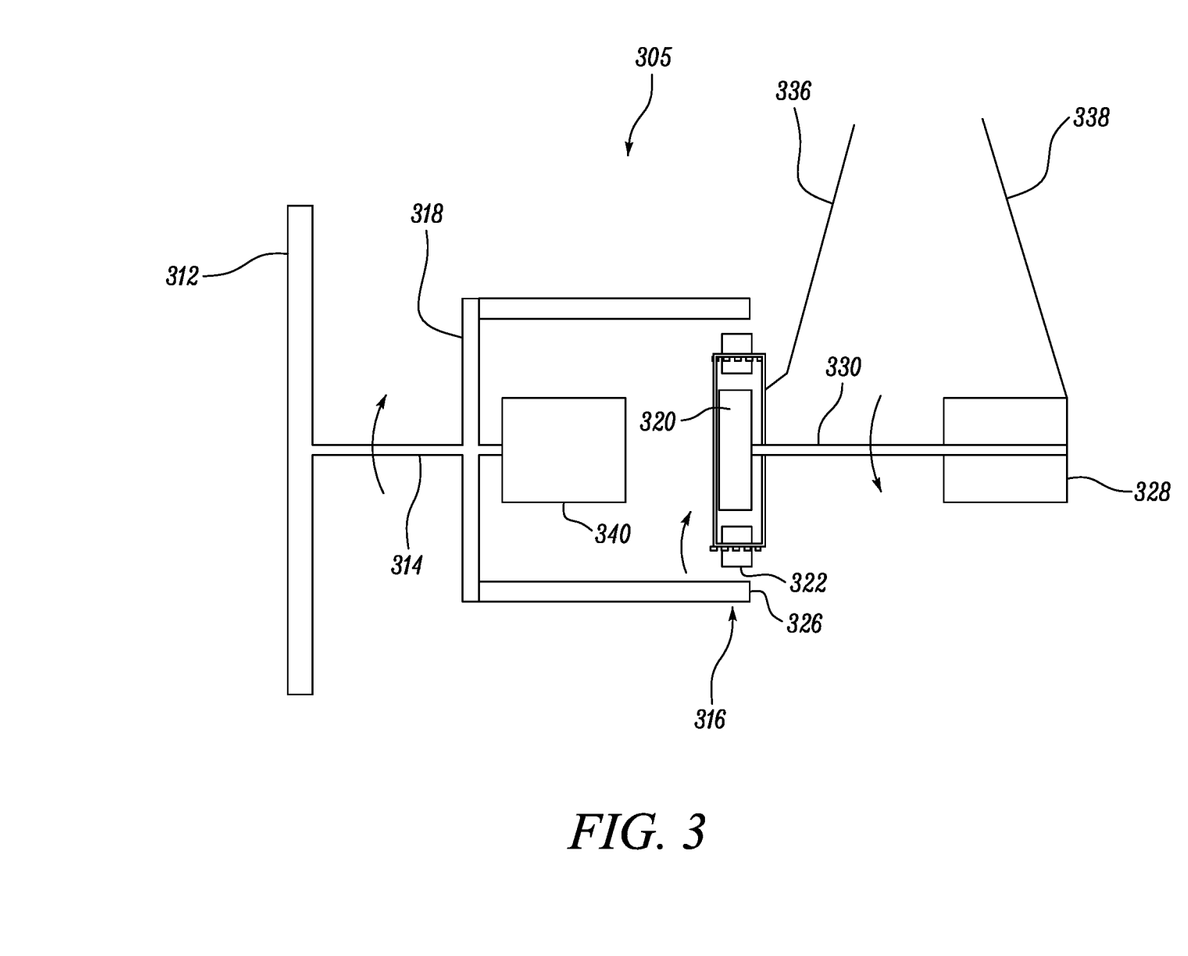
FIG. 3 is a schematic diagram of an alternative propulsion system for the aircraft of FIG. 1.

FIG. 3 shows an alternative propulsion system 305. The system 305 is similar to the system 5, and comprises a propulsive fan 312 driven by a fan shaft 314, which is in turn driven by a star reduction gearbox 316, which is in turn driven by a first electric motor 328 via an input shaft 330. The propulsion system is mounted by a static mounting system 336, 338. Each of the above components are similar to those of the system 5, and so are not described in further detail.

The propulsion system 305 further comprises a second motor 340, which is coupled to the fan 312 via the fan shaft 314, and so rotates in the same direction as the fan 312, and opposite to the direction that the first motor 328 turns.

It will be understood that the propulsion system 305 now comprises a fan 312, fan shaft 314, output shaft 318, ring gear 326, planet gears 322, and, additionally, second motor 340, which rotate in a first direction. The system also includes a sun gear 320, motor shaft 330 and first motor 328 which spins in a second direction.

Consequently, the system 305 can be arranged to cancel the gyroscopic forces as described above. The provision of a second electric motor 340 which rotates in an opposite direction to the first motor 328 allows the designer additional design freedom when choosing motor 328, 340 sizes and speeds, which may enable a less compromised design, whilst also substantially cancelling gyroscopic forces.

Figure 4:
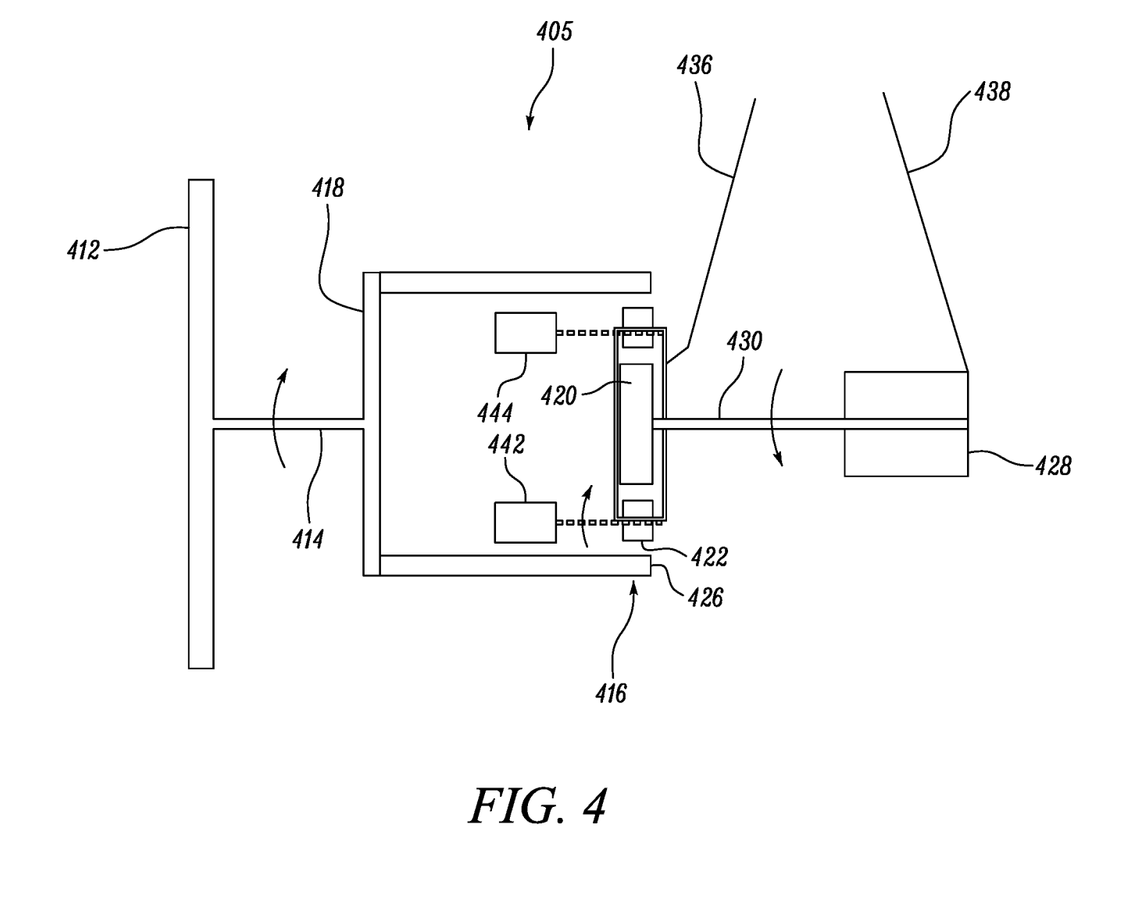
FIG. 4 is a schematic diagram of a further alternative propulsion system for the aircraft of FIG. 1.

FIG. 4 shows a further alternative propulsion system 405. The system 405 is similar to the systems 5, 305 and comprises a propulsive fan 412 driven by a fan shaft 414, which is in turn driven by a star reduction gearbox 416, which is in turn driven by a first electric motor 428 via an input shaft 430. The propulsion system 405 is mounted by a static mounting system 436, 438. Each of the above components are similar to those of the system 5, and so are not described in further detail.

The propulsion system 405 further comprises second and third motors 442, 444, which are each coupled to the gearbox 416 via respective planet gears 422, and so rotates in the same direction as the fan 412, and opposite to the direction that the first motor 428 turns.

It will be understood that the propulsion system 405 now comprises a fan 412, fan shaft 414, output shaft 418, ring gear 426, planet gears 422, and, additionally, second and third motors 442, 444, which rotate in a first direction. The system also includes a sun gear 420, motor shaft 430 and first motor 428 which spins in a second direction. It will be appreciated that additional motors could be provided coupled to each planet gear, and configured to rotate with each planet gear, where additional planet gears are present.

Again, the system 405 can be arranged to cancel the gyroscopic forces as described above. The provision of second and third electric motors 442, 444 which rotate in an opposite direction the first motor 428 again allows the designer additional design freedom when choosing motor 428 sizes and speeds, which may enable a less compromised design, whilst also substantially cancelling gyroscopic forces.

Accordingly, a propulsion system is provided having reduced structural loads during manoeuvres and breakages, thereby allowing for reduced structural weight. A designer may design such a propulsion system according to the following design methodology, as set out below.

The designer may design one of a propulsor, a motor and a reduction gearbox coupled to the motor at an input side, and the propulsor at an output side. As noted above, the reduction gearbox is configured to provide a reduction ratio between the input and output, and is configured such that the input side rotates in an opposite direction to the output side (e.g. a star gearbox).

The designer then modifies the design of the motor, propulsor and reduction gearbox such that gyroscopic forces of the propulsor, motor and reduction gearbox generated during aircraft manoeuvres and/or propulsion system failures are substantially cancelled. This is ensured by changing the diameters, masses and mass distributions of the rotating components, and the gear ratio of the reduction gearbox, until the desired gyroscopic force cancellation is achieved.

Figure 8:
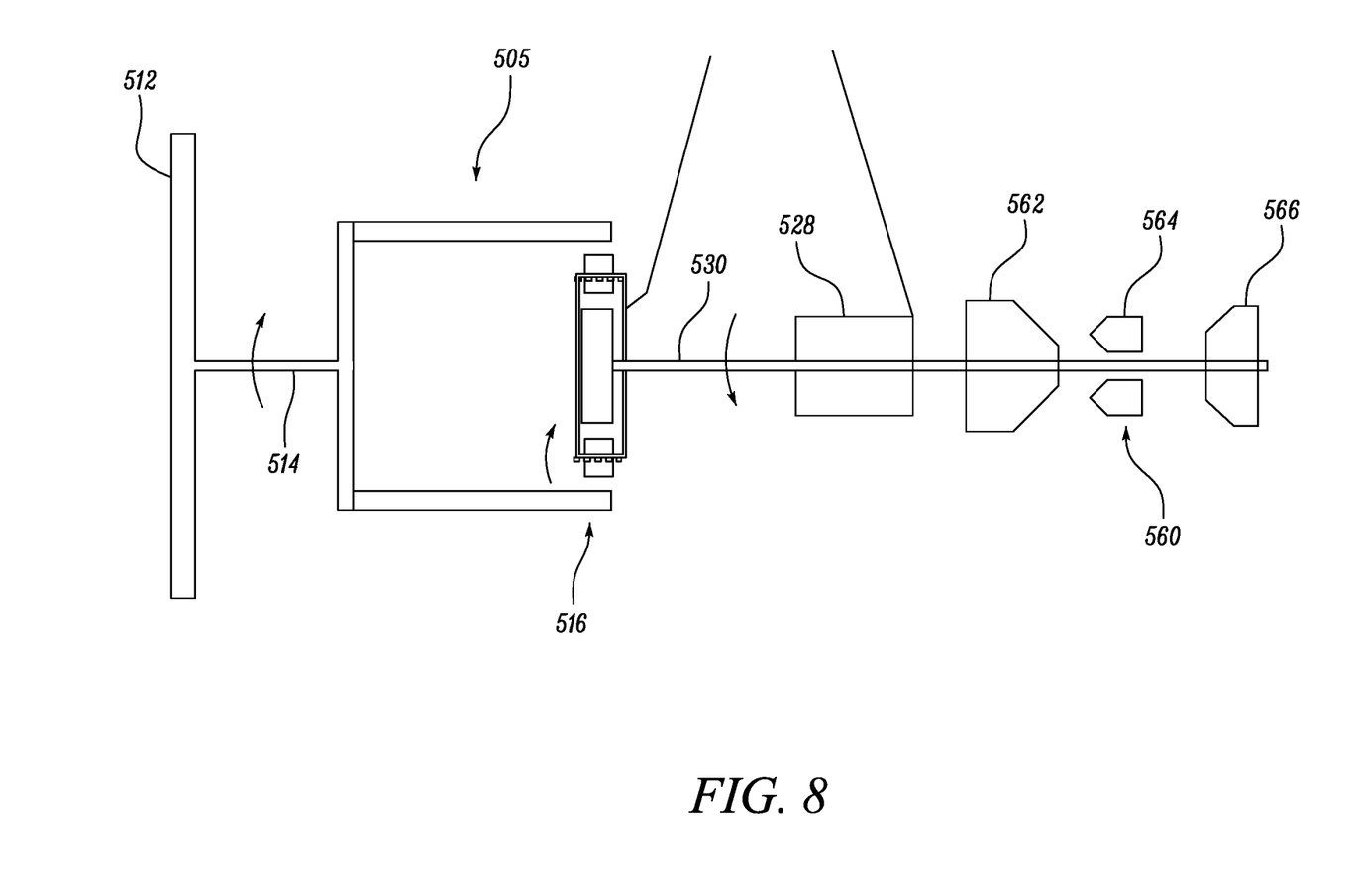
FIG. 8 is a schematic diagram of a parallel hybrid propulsion system for the aircraft of FIG. 1.

The disclosed arrangement may also be applied to a parallel propulsion system 505, such as that shown in FIG. 8.

The propulsion system 505 of FIG. 8 comprises a propulsor 512, which is coupled to a fan shaft 514, star gearbox 516, motor shaft 530 and motor 528, which are arranged in a similar manner to the first embodiment. Also coupled to the motor shaft 520 is a prime mover comprising an internal combustion engine in the form of a gas turbine engine 560. The gas turbine engine is a single-spool gas turbine engine 560 comprising a compressor 562, combustor 564 and turbine 566 which are arranged in the normal manner. The compressor 562 supplies compressed air to the combustor 564, which heats the air, and provides high temperature air to the turbine 566. The turbine 566 then drives the compressor 562 and the motor 528 via the motor shaft 530.

Consequently, the fan 512 is driven by one or both of the gas turbine engine turbine 566 and the motor 528. As will be understood, the propulsion system 505 comprises additional rotating components on the input side compared to the propulsion systems 5, 305, 405, namely the compressor 562 and turbine 566, which each rotate in the same direction as the shaft 530.

In this embodiment, the gearbox reduction ratio, gearbox component, fan, gearbox, motor 28, compressor and turbine masses and mass distributions are arranged such that the gyroscopic forces imposed on the system by the rotating masses on the input side (i.e. the turbine 566, compressor 562, motor 528, shaft 530 and sun gear) are cancelled by the masses on the output side (planets, ring gear, shaft 514 and fan 512).

Figure 9:
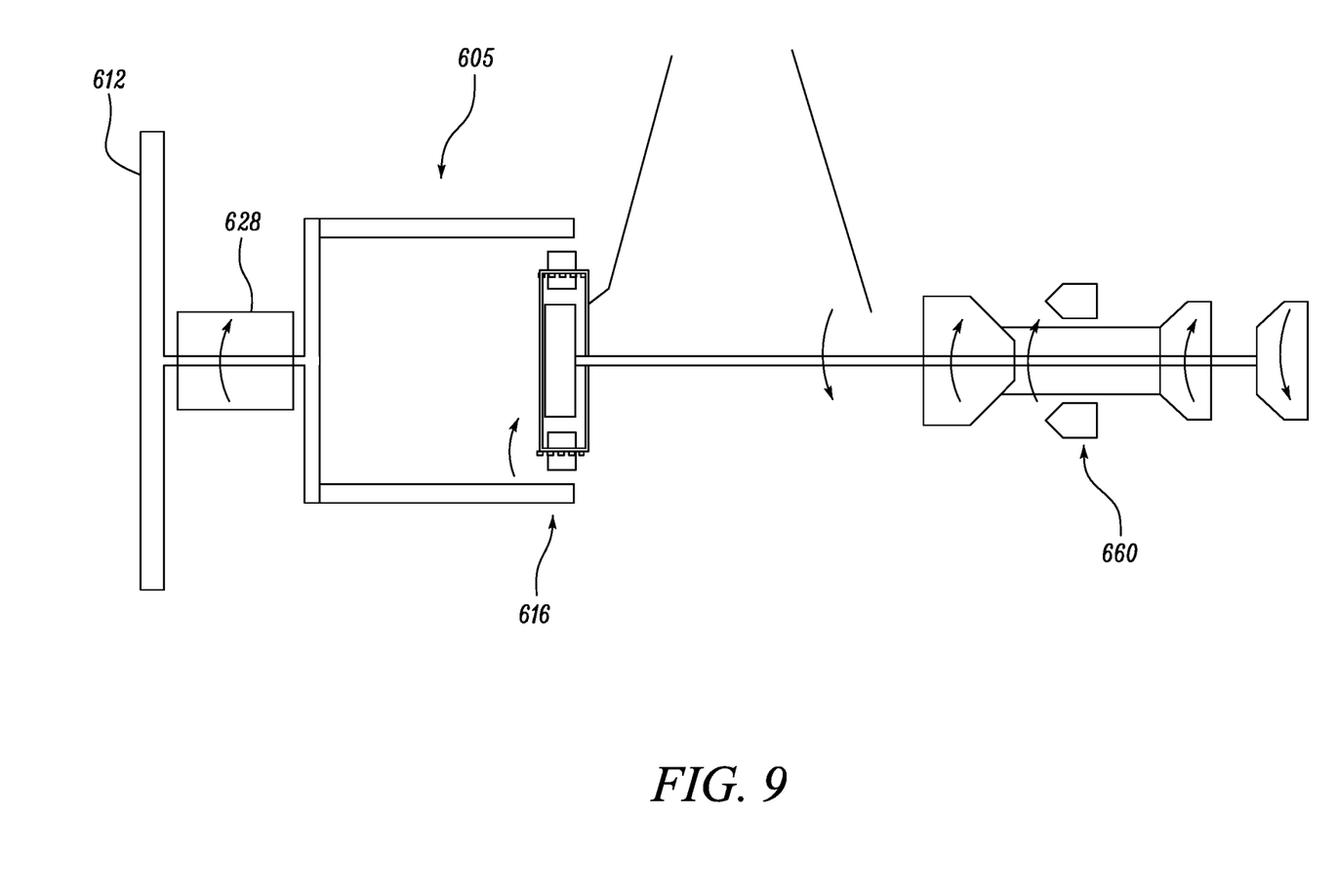
FIG. 9 is a schematic diagram of an alternative parallel hybrid propulsion system for the aircraft of FIG. 1.

FIG. 9 shows a variation of the parallel hybrid propulsion system of FIG. 8.

In the propulsion system 605 of FIG. 9, a motor 628 is provided on the output side of a gearbox 616, while the gas turbine engine 660 is provided on the input side. As will be understood, the gas turbine engine rotating components now rotate in an opposite direction to the motor 628. Additionally, the motor 628 rotates at the same speed as the fan 612. In view of the additional rotating mass on the output side, and reduced rotating mass on the input side, this may help balance the angular momentum of the input and output sides relative to the arrangement shown in FIG. 8, which may assist the designer in configuring the propulsion system 605 to have substantially no gyroscopic forces.

Figure 10:
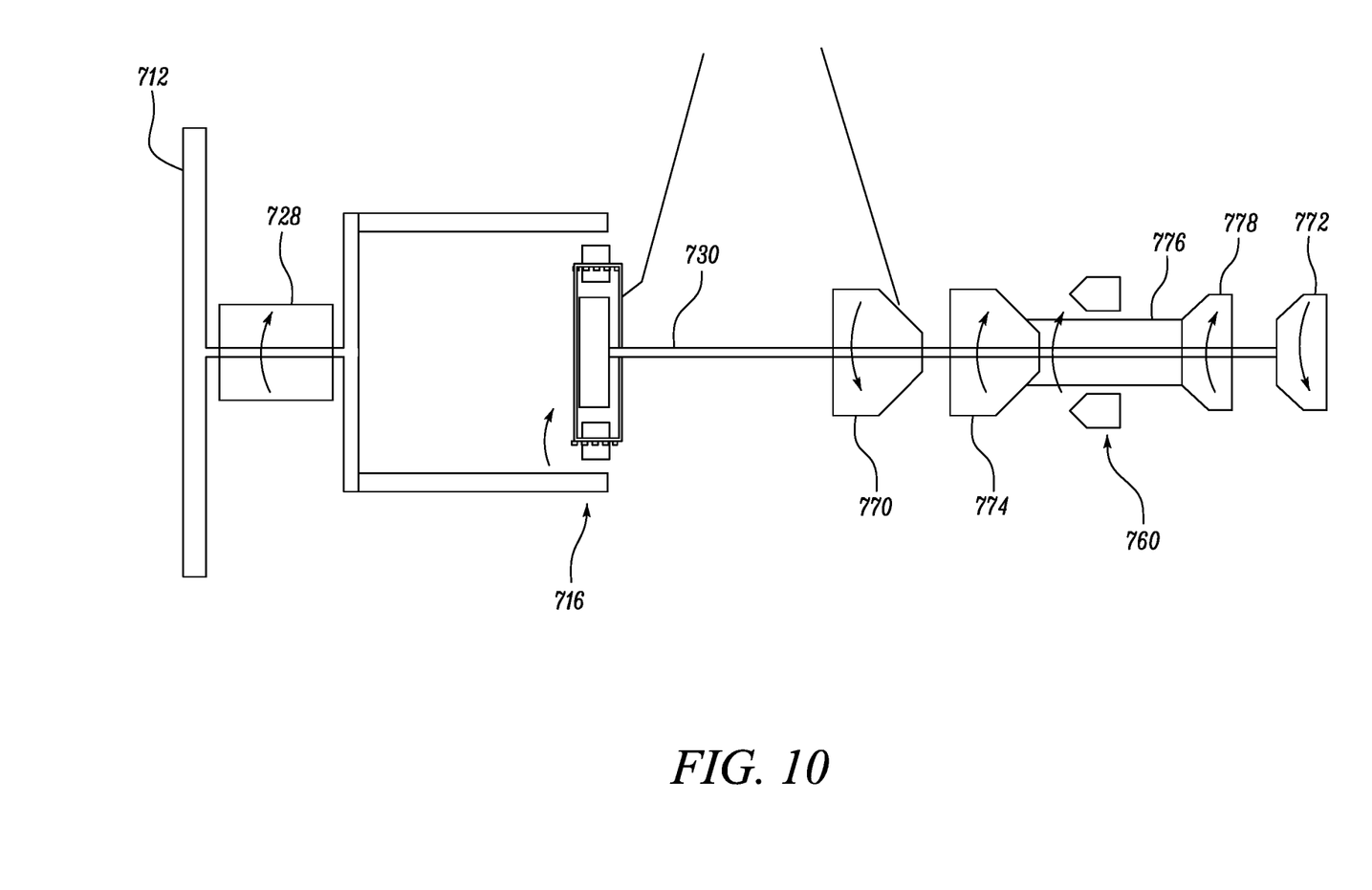
FIG. 10 is a schematic diagram of a further alternative parallel hybrid propulsion system for the aircraft of FIG. 1.

FIG. 10 shows a further variation of a parallel hybrid propulsion system.

The propulsion system of FIG. 10 is similar to that of FIG. 9, and so only differences are described.

In the system of FIG. 10, the gas turbine engine 760 comprises a two-spool contra-rotating gas turbine engine. The gas turbine engine comprises a low-pressure spool comprising a low-pressure compressor 770, a low-pressure shaft 730 and a low-pressure turbine 772. The low-pressure shaft 730 is coupled to an input side of a star reduction gearbox 716. A motor 728 and fan 712 are coupled to the output side of the gearbox 716. Additionally, a high-pressure spool is provided, comprising a high-pressure compressor 774, a high-pressure shaft 776 and a high-pressure turbine 778. The two spools contra-rotate, thereby at least partially offsetting the gyroscopic forces generated by the engine 760 during manoeuvres.

Again, by arranging the clockwise in use rotating components and the anti-clockwise rotating components, along with the reduction gear ratio, such that the gyroscopic forces are substantially cancelled, maneuvering forces can be substantially reduced.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. For instance, the motor could be provided on the input side of the propulsion system having a two-spool gas turbine engine. Any of the motors of FIGS. 5 to 7 could be employed with any of the motors of any of the propulsion systems of any of the embodiments. Similarly, additional motors installed in locations as shown in FIGS. 3 and 4 could be provided in the arrangements shown in FIGS. 8 and 9.

Different types of motors could be employed, such as induction motors. Different types of prime movers, such as piston engines could be employed in place of the gas turbine engine. The gas turbine engine could be omitted, with the aircraft being wholly battery or fuel cell powered, with the prime mover comprising the motor.

Similarly, different types of gearboxes could be employed. For example, the gearbox could comprise a step-aside gearbox, a differential gearbox, or any suitable gearbox in which the input and output rotation direction is reversed. In some examples, the gearbox could comprise a step-up gearbox, in which the output speed is faster than the input speed. In other cases, the input and output speed could be equal. Similarly, the reduction ratio could be greater than the examples given, and several gearbox types could be combined.

What is claimed is:

1. An aircraft propulsion system comprising:
   a propulsor;
   a motor; and
   a reduction gearbox coupled to a prime mover at an input side, and the propulsor at an output side, the reduction gearbox being configured to provide a reduction ratio between the input and output; wherein
   the reduction gearbox is configured such that the input side rotates in an opposite direction to the output side, and
   the motor, propulsor and at least a gear of the reduction gearbox are configured to rotate in either a clockwise or anti-clockwise direction such that, at each operational input and output rotational speed, total angular momentum of clockwise rotating components is within 50% of total angular momentum of anti-clockwise rotating components which results in gyroscopic forces of the propulsor, motor, prime mover and reduction gearbox generated during an aircraft manoeuvre being substantially cancelled.

2. The aircraft propulsion system according to claim 1, wherein the prime mover comprises an internal combustion engine.

3. The aircraft propulsion system according to claim 1, wherein the motor is provided on the input or output side of the reduction gearbox.

4. The aircraft propulsion system according to claim 1, wherein the reduction gearbox comprises an epicyclic gearbox in the form of a star gearbox comprising a sun gear defining the input side, one or more planet gears which mesh with the sun gear, a statically mounted planet carrier configured to rotatably mount the planet gears, and a ring gear which meshes with the planet gears, the ring gear being configured to rotate to define the output side.

5. The aircraft propulsion system according to claim 4, wherein the propulsion system comprises one or more further electrical motors each coupled to a respective planet gear.

6. The aircraft propulsion system according to claim 4, wherein the propulsion system comprises a further electric motor coupled to the output side of the gearbox.

7. The aircraft propulsion system according to claim 1, wherein the gearbox comprises a reduction ratio of between 1.5:1 and 3.5:1.

8. The aircraft propulsion system according to claim 1, wherein the motor comprises one of an axial flux motor and a radial flux motor.

9. The aircraft propulsion system according to claim 8, wherein the motor comprises a rotor radially inward of a stator, or a rotor radially outward of a stator.

10. The aircraft propulsion system according to claim 1, wherein the propulsor comprises one of an open rotor propeller and a ducted fan.

11. The aircraft propulsion system according to claim 1, wherein the motor, propulsor and reduction gearbox are configured such that, at a given input and output rotational speed, the total angular momentum of clockwise rotating components is within 50% of the sum of total angular momentum of anti-clockwise rotating components.

12. The aircraft propulsion system according to claim 11, wherein at a given input and output rotational speed, the total angular momentum of clockwise rotating components is within 20%, preferably within 10% and more preferably within 5% of the sum of total angular momentum of anti-clockwise rotating components.

13. A method of designing an aircraft propulsion system comprising
   defining a propulsor;
   defining a motor; and
   defining a reduction gearbox coupled to the motor at an input side, and the propulsor at an output side, the reduction gearbox being configured to provide a reduction ratio between the input and output, the reduction gearbox being configured such that the input side rotates in an opposite direction to the output side; and
   designing the motor, propulsor and at least a gear of the reduction gearbox to rotate in either a clockwise or anti-clockwise direction such that, at each operational input and output rotational speed, total angular momentum of clockwise rotating components is within 50% of total angular momentum of anti-clockwise rotating components which results in gyroscopic forces of the propulsor, motor and reduction gearbox generated during an aircraft manoeuvre being substantially cancelled.

14. The aircraft propulsion system according to claim 1, wherein the prime mover comprises a gas turbine engine.

* * * * *